July 29, 1941.    D. FRISOLI    2,250,796
DOUBLE POINTED BLADE AND HOLDER THEREFOR
Filed Oct. 26, 1939
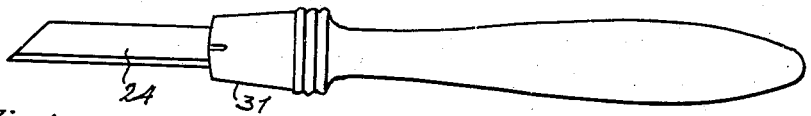
Fig.1
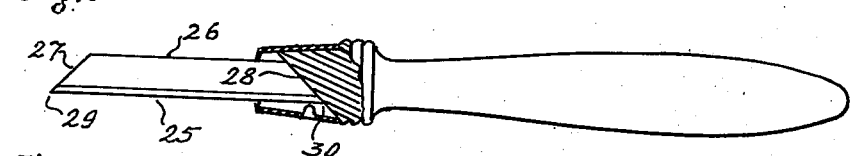
Fig.2
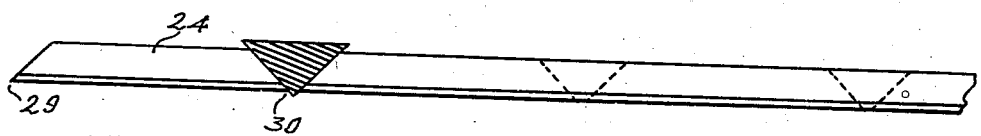
Fig.3
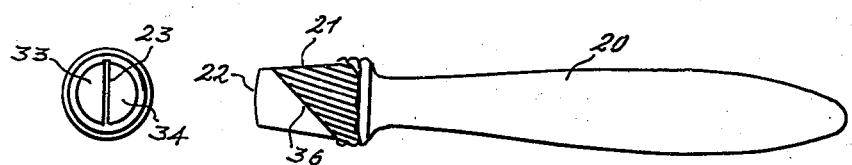
Fig.5  Fig.4
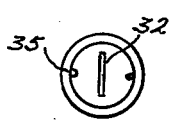  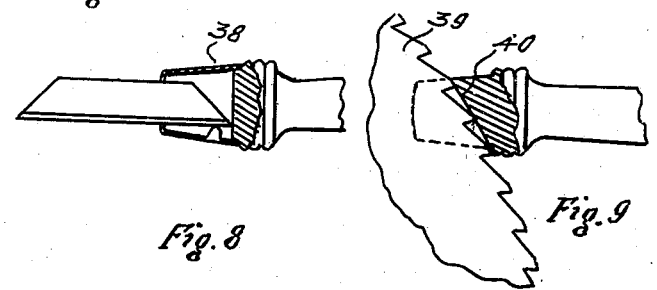
Fig.7  Fig.6  Fig.8  Fig.9
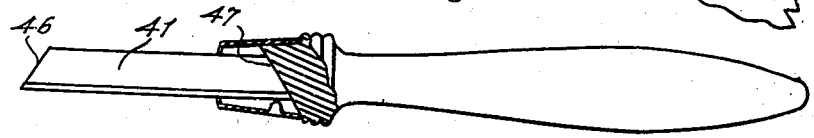
Fig.10
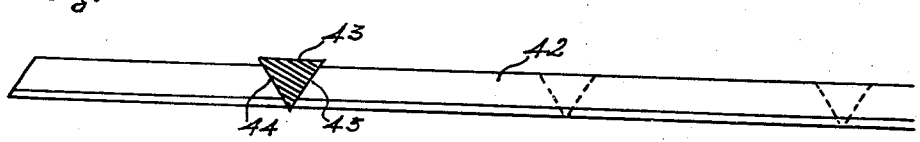
Fig.11
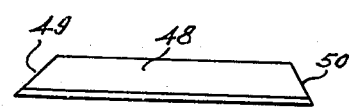
Fig.12
INVENTOR
Domenico Frisoli
BY
Guido ur Sacerdote
ATTORNEY Patented July 29, 1941

2,250,796

UNITED STATES PATENT OFFICE 2,250,796

DOUBLE POINTED BLADE AND HOLDER THEREFOR

Domenico Frisoli, Newark, N. J.

Application October 26, 1939, Serial No. 301,473

3 Claims. (Cl. 30—329)

This invention relates to cutting implements and more particularly refers to improvements in knives and knife blades of a type particularly suitable for trimming paper or cutting clippings and for other like purposes.

Knives of the type to which this invention refers intended for the purposes mentioned, generally consist of a holder and a thin blade mounted in said holder, the knife being used not by cutting the material with its edge as a whole but by running the outer end of its cutting edge along the line of cutting. When the blade used is of rectangular shape such as, for instance, a safety razor blade, its forward edge intercepts proper vision and thus interferes with the performance of the work.

In a patent entitled, "Utility knife," dated May 25, 1937, Patent No. 2,081,702, I have described a utility knife in which the blade element has its front edge rearwardly inclined with respect to the cutting edge, forming therewith a cutting point at the forward end of the blade, the slanted front edge permitting at all times an unhampered vision of the cutting point, thus greatly facilitating cutting and trimming operations.

The blade constituting one of the features of the invention described in my aforesaid patent was obtained by cutting a steel ribbon at uniformly spaced intervals by means of a shearing tool having its cutting edge directed at an angle of less than ninety degrees to the cutting edge of the blades, so that the blades thus produced had an elongated rhomboid shape with the rear edge parallel to the front edge.

Blades of this character preferably have only one of their longitudinal edges sharpened to form a cutting edge, the other edge being used for handling purposes and being left dull in order to avoid possible injury to the user in handling; therefore, only the point formed by the front edge with the cutting edge may be used for cutting or trimming, so that when the cutting point has become dull the blade has to be discarded and a new blade must be placed in the holder in its place.

The primary object of this invention is to provide a novel and improved type of blade, adapted to be reversibly mounted in a suitable holder, said blade having a cutting point at each end and having, therefore, twice the cutting capacity of an ordinary blade at no extra cost.

Another object is to provide novel and improved means of an inexpensive character for mounting a blade of the type mentioned and firmly holding the blade in position to form therewith a rigid whole.

A further object is to provide, in connection with a blade of the type specified and a slotted handle therefor, a capped ferrule of a novel and improved construction, adapted to be mounted over the blade holding end of said handle so as to clamp the blade in position, at the same time providing an abutment for said blade insuring its rigid mounting and preventing its wabbling due to the application of pressure against its cutting point.

Other objects and advantages of the present invention will more fully appear as the description proceeds and will be set forth and claimed in the appended claims.

My invention is illustrated by way of example in the accompanying drawing, in which:

Fig. 1 is a side view of a knife embodying my invention;

Fig. 2 is a similar view of the knife, partly sectioned to illustrate the manner in which the blade is mounted in the handle;

Fig. 3 is a plan view of a steel ribbon having one of its edges sharpened to produce a cutting edge, said view illustrating the manner of producing the blade constituting the main feature of my invention;

Fig. 4 is a side view of the handle shown in Figs. 1 and 2, partly sectioned to better illustrate the construction of its blade holding end;

Fig. 5 is an end view thereof;

Fig. 6 is a longitudinal section of the capped ferrule used in connection with the handle of Fig. 4;

Fig. 7 is an end view thereof;

Fig. 8 is a fragmentary view, partly sectioned, of a knife similar to that shown in Figs. 1 and 2, in which the bottom of the blade retaining slot in the handle is directed at right angles to the cutting edge of the blade;

Fig. 9 is a fragmentary view of the blade holding end of a handle, illustrating the manner of cutting the blade holding slot in the same by means of a circular saw blade;

Fig. 10 illustrates a complete knife, partly sectioned, comprising a handle of the type shown in Fig. 9 and a blade having its end edges adapted to register with the curved outline of the bottom of the blade holding slot;

Fig. 11 is a view similar to Fig. 3, illustrating the manner of producing the blade shown in Fig. 10; and Fig. 12 is a plan view of a blade embodying my invention in an alternative form, in which the front and rear edges are inclined at different angles with respect to the cutting edge.

Referring to Figs. 1 to 7, 20 designates a handle having a front shank portion 21 which preferably tapers slightly towards its outer end 22, said shank portion being provided with a transversal slot 23 adapted to receive one of the ends of the blade 24.

Said blade has a cutting edge 25, a dull back edge 26, and front and rear edges 27, 28, inwardly inclined with respect to the cutting edge at an angle considerably less than ninety degrees, forming in the blade two cutting points 29, 30, one at each end.

In order to form the knife, one of the ends of the blade is inserted in the slot 23 and then a capped ferrule 31 is placed over the shank portion 21, the tip end of said capped ferrule having a transversal slotted opening 32 through which the blade may project, as Figs. 1 and 2 clearly show.

The body of said ferrule is preferably slightly flaring to receive the tapering shank portion 21 of the handle with a very tight fit, so that when said ferrule is placed in position it will compress the two halves 33, 34 of the shank portion 21 separated by the slot 23 and will cause the same to firmly clamp the blade inserted therebetween.

In order to insure a better grip for the ferrule, the same is preferably formed with lugs or indentations 35, adapted to bite into the body of the shank portion 21 in a well known manner.

The slot 23 in shank portion 21 is shown cut with its bottom 36 at an angle corresponding to that of the end edges 27, 28 of the blade, so that said bottom forms an abutment for the end edge of the portion of the blade inserted within the slot, as Fig. 2 clearly shows.

Although the blade is clamped firmly in place by the action of the ferrule 31, when pressure is applied against its cutting edge 29 the tendency of the blade is to "give" insofar as the length of the slot 32 in the bottom of the ferrule will permit and if the pressure applied is excessive the blade will actually become somewhat displaced from its proper position.

In order to prevent this possibility I prefer to provide some sort of abutment also for the cutting edge of that portion of the blade which is inserted in the slot, said abutment maintaining the blade in its proper alignment. A simple way of attaining this end is illustrated in Figs. 2 and 6, in which it is seen that the ferrule is formed with an inwardly directed tongue or lug 37 in the same plane with slot 32, said tongue or lug being adapted to enter slot 23 and to extend therein to the line of the cutting edge of the blade, as shown in Fig. 2.

Although I prefer to cut the slot in the handle with its bottom at a slant registering with the end edge of the blade, it is within the scope of my invention to cut the slot with its bottom at a different angle, for instance, at right angles to the axis of the handle, as shown at 38 in Fig. 8.

The slot shown in Figs. 2 and 4 is shown as having a straight bottom registering with the straight outline of the end edges of the blade. Such a slot can be cut in the handle by means of a band saw or by means of a saw having a straight reciprocating blade. At times it may be more convenient to use a disk saw, as shown at 39 in Fig. 9, and in such case the bottom 40 of the slot produced will have a curved outline. The blade 41 used in connection with a handle having a slot produced in this manner may accordingly be cut from the strip 42 by means of punch 43 having similarly curved cutting edges 44, 45, so as to produce in the blade curved end edges 46, 47, adapted to register with the bottom 40 of the slot.

Although I prefer to make the blade with symmetrical end edges, as shown in Figs. 2, 3, 10 and 11, it is within the scope of my invention to cut the end edges of the blade at different angles, as shown in Fig. 12, where the blade 48 has one end edge 49 cut at an angle of forty-five degrees and the other end edge 50 at an angle of sixty degrees.

Such an arrangement produces two cutting points in the blade and, therefore, a reversible blade which can be used in connection with a handle of the type shown in Fig. 8.

It will be understood that although the blade is held firmly in place by the action of the ferrule, it can be withdrawn from the slot without difficulty with the aid of a pair of pliers and replaced after reversal with equal ease.

For economy in manufacture the handle is preferably made of wood, although other materials such as Celluloid or any suitable plastic can also be used.

Minor constructional details of my invention may vary to a certain extent from those shown without departing from the inventive idea. The drawing should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. As a new article of manufacture, a blade having a cutting edge, and two end edges symmetrically inwardly inclined with respect thereto, whereby the blade will be reversible with a cutting point at each end.

2. A cutting implement of the character described, comprising a handle having a slot at the blade holding end, a reversible blade having a cutting edge and two end edges inwardly inclined with respect thereto, having one of its ends inserted within said slot, a capped ferrule mounted over said blade holding end, said ferrule having an opening registering with, and through which said blade projects, retaining said blade in position, and an abutment formed in the capped ferrule for holding the blade against vertical displacement.

3. A cutting implement of the character described, comprising a blade having a cutting edge and two end edges symmetrically inwardly inclined with respect thereto, a handle for said blade, having a slot at the blade holding end within which one of the ends of said blade is inserted, the bottom of said slot registering with, and forming an abutment for the end edge of said blade, and means for securing said blade in position, and an abutment formed in the capped ferrule for holding the blade against vertical displacement.

DOMENICO FRISOLI.